United States Patent
Yokoyama

(10) Patent No.: US 11,359,683 B2
(45) Date of Patent: Jun. 14, 2022

(54) DISC-BRAKE APPARATUS

(71) Applicant: TOYOTA JIDOSHA KABUSHIKI KAISHA, Toyota (JP)

(72) Inventor: Tomohiro Yokoyama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 369 days.

(21) Appl. No.: 16/693,527

(22) Filed: Nov. 25, 2019

(65) Prior Publication Data

US 2020/0191210 A1    Jun. 18, 2020

(30) Foreign Application Priority Data

Dec. 17, 2018 (JP) .............................. JP2018-235725

(51) Int. Cl.
  *F16D 55/22* (2006.01)
  *F16D 55/00* (2006.01)
  *F16D 55/226* (2006.01)
  *F16D 121/24* (2012.01)

(52) U.S. Cl.
  CPC .... *F16D 55/226* (2013.01); *F16D 2055/0004* (2013.01); *F16D 2121/24* (2013.01)

(58) Field of Classification Search
  CPC .......... F16D 55/226; F16D 2055/0004; F16D 2121/24; F16D 55/228
  See application file for complete search history.

(56) References Cited

U.S. PATENT DOCUMENTS

| | | | | |
|---|---|---|---|---|
| 3,428,152 A | * | 2/1969 | Hoenick | F16D 55/2262 188/72.5 |
| 3,480,116 A | * | 11/1969 | Rath | F16D 55/2262 188/73.43 |
| 3,482,657 A | * | 12/1969 | Zeitrager | F16D 65/567 188/196 R |
| 3,493,084 A | * | 2/1970 | Maurice | F16D 65/0977 188/73.47 |
| 3,561,572 A | * | 2/1971 | Flegl | F16D 65/095 188/73.32 |
| 3,692,151 A | * | 9/1972 | Kobayashi | F16D 65/543 188/73.47 |

(Continued)

FOREIGN PATENT DOCUMENTS

JP   11-287267 A   10/1999
JP   2005-113995 A   4/2005
(Continued)

*Primary Examiner* — Robert A. Siconolfi
*Assistant Examiner* — James K Hsiao
(74) *Attorney, Agent, or Firm* — Sughrue Mion, PLLC

(57) ABSTRACT

A disc brake of a disc-brake apparatus includes an inner pad and an outer pad, a pressing device, and a housing. The pressing device includes: a first pressing member movable toward a rotation disc; a second pressing member movable away from the rotation disc; a frame; and an electric actuator that moves the first pressing member and the second pressing member. The electric actuator includes: a two-axis motor including a stator having coils and having a substantially cylindrical shape, an inner rotor, and an outer rotor; a first motion converter that converts rotation of the inner rotor to linear movement to transmit the linear movement to the first pressing member; and a second motion converter that converts rotation of the outer rotor to linear movement to transmit the linear movement to the second pressing member.

4 Claims, 9 Drawing Sheets

(56) References Cited

U.S. PATENT DOCUMENTS

| | | | |
|---|---|---|---|
| 6,158,558 A * | 12/2000 | Bill | F16D 65/18 |
| | | | 188/162 |
| 6,373,160 B1 | 4/2002 | Schrodl | |
| 6,695,099 B1 * | 2/2004 | Waag | F16D 65/183 |
| | | | 188/72.3 |
| 8,136,641 B2 * | 3/2012 | Wang | F16D 65/18 |
| | | | 188/162 |
| 8,205,725 B2 * | 6/2012 | Sakashita | F16D 65/568 |
| | | | 188/162 |
| 9,435,411 B2 * | 9/2016 | Eguchi | F16C 19/305 |
| 9,989,114 B2 * | 6/2018 | Chelaidite | F16D 55/22 |
| 10,100,892 B2 * | 10/2018 | Yabusaki | F16D 65/0075 |
| 10,816,053 B2 * | 10/2020 | Yokoyama | F16D 65/72 |
| 11,078,976 B2 * | 8/2021 | Yokoyama | F16D 55/2262 |
| 2004/0026181 A1 * | 2/2004 | Baumgartner | F16D 65/0037 |
| | | | 188/71.7 |
| 2005/0039991 A1 * | 2/2005 | Severinsson | H02K 7/102 |
| | | | 188/72.1 |
| 2005/0247528 A1 * | 11/2005 | Schack | F16D 55/226 |
| | | | 188/72.8 |
| 2007/0290563 A1 | 12/2007 | Zhao et al. | |
| 2016/0032994 A1 * | 2/2016 | Sakashita | F16D 55/225 |
| | | | 188/72.3 |
| 2017/0276197 A1 * | 9/2017 | Yabusaki | B60T 13/741 |
| 2017/0276199 A1 * | 9/2017 | Yabusaki | F16D 66/026 |
| 2019/0056006 A1 * | 2/2019 | Chelaidite | F16D 65/18 |
| 2019/0176781 A1 * | 6/2019 | Yokoyama | F16D 55/227 |
| 2019/0178320 A1 * | 6/2019 | Yokoyama | F16D 55/226 |
| 2019/0389444 A1 * | 12/2019 | Kistner | B60T 13/74 |
| 2020/0049215 A1 * | 2/2020 | Song | F16D 55/226 |
| 2020/0240485 A1 * | 7/2020 | Nanahara | F16D 65/183 |
| 2020/0263768 A1 * | 8/2020 | Nanahara | F16D 65/16 |

FOREIGN PATENT DOCUMENTS

| | | |
|---|---|---|
| JP | 2015-169301 A | 9/2015 |
| JP | 2017-207104 A | 11/2017 |
| JP | 2019-100530 A | 6/2019 |

* cited by examiner

FOR INNER ROTOR

FOR OUTER ROTOR

DISC-BRAKE APPARATUS

CROSS REFERENCE TO RELATED APPLICATION

The present application claims priority from Japanese Patent Application No. 2018-235725, which was filed on Dec. 17, 2018, the disclosure of which is herein incorporated by reference in its entirety.

BACKGROUND

The following disclosure relates to a disc-brake apparatus including a disc brake mounted on a wheel of a vehicle.

Patent Document 1 (Japanese Patent Application Publication No. 2017-207104) discloses a floating-type disc-brake apparatus including: an inner pad and an outer pad respectively located on opposite sides of a rotor rotatable with a wheel; and a pressing device configured to press the inner pad and the outer pad against the rotor. The pressing device includes: a cylindrical unit (see FIG. 5) operable by a hydraulic pressure and including a first piston movable toward a rotor and a second piston movable away from the rotor; and a caliper held movably in a direction parallel with the rotation axis of the rotor and having such a shape that extends over outer circumferential surfaces of the inner pad and the outer pad. In the present disc-brake apparatus, a hydraulic pressure moves the first piston toward the rotor to press the inner pad against the rotor. Also, a hydraulic pressure moves the second piston away from the rotor to move the caliper, thereby pressing the outer pad against the rotor.

SUMMARY

Accordingly, an aspect of the disclosure relates to electrification of a disc-brake apparatus including a first pressing member and a second pressing member and to reduction of the length of the disc-brake apparatus in its axial direction.

In a disc-brake apparatus according to one aspect of the disclosure, a pressing device includes: a first pressing member and a second pressing member configured to press an inner pad and an outer pad against a rotation disc; and an electric actuator including a two-axis motor. The two-axis motor includes: a stator having a substantially cylindrical shape; an inner rotor provided on an inner circumferential side of the stator; and an outer rotor provided on an outer circumferential side of the stator. A supply current to be supplied to each of a plurality of coils of the stator is controlled to rotate the inner rotor and the outer rotor. The rotation of the inner rotor moves the first pressing member toward the rotation disc to press the inner pad against the rotation disc. The rotation of the outer rotor moves the second pressing member away from the rotation disc to move the frame. As a result, the outer pad is pressed against the rotation disc. Thus, the inner rotor and the outer rotor overlap each other in the radial direction in the two-axis motor. With this configuration, when compared with the case where the inner rotor and the outer rotor are arranged in the axial direction, it is possible to reduce the length of the electric actuator in the axial direction, thereby reducing the length of the disc-brake apparatus in the axial direction.

BRIEF DESCRIPTION OF THE DRAWINGS

The objects, features, advantages, and technical and industrial significance of the present disclosure will be better understood by reading the following detailed description of the embodiment, when considered in connection with the accompanying drawings, in which.

EMBODIMENT

Hereinafter, there will be described a disc-brake apparatus provided for a wheel of a vehicle according to one embodiment by reference to the drawings.

Figure 1:
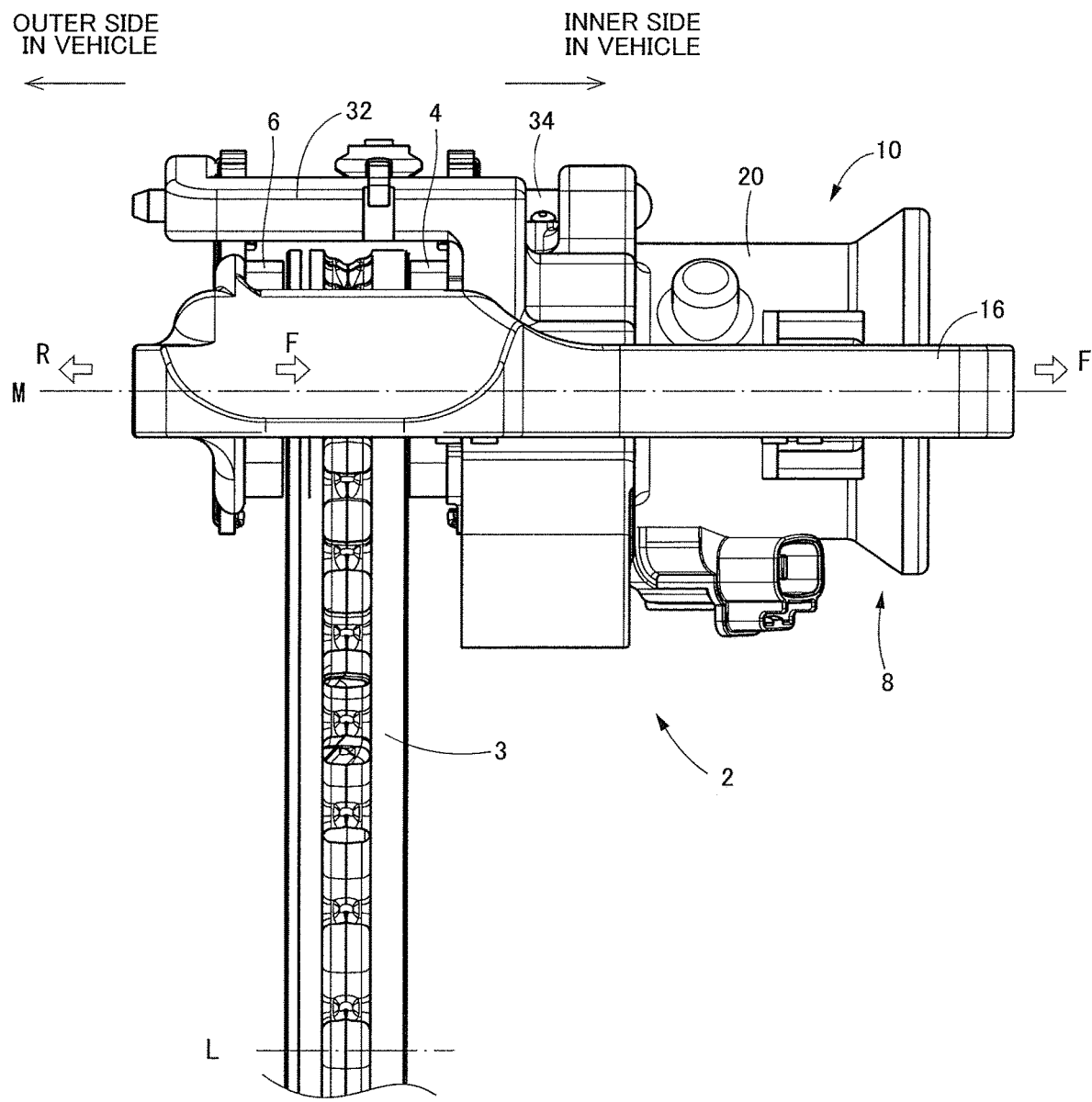
FIG. 1 is a side view of a disc brake of a disc-brake apparatus according to one embodiment.
Figure 2:
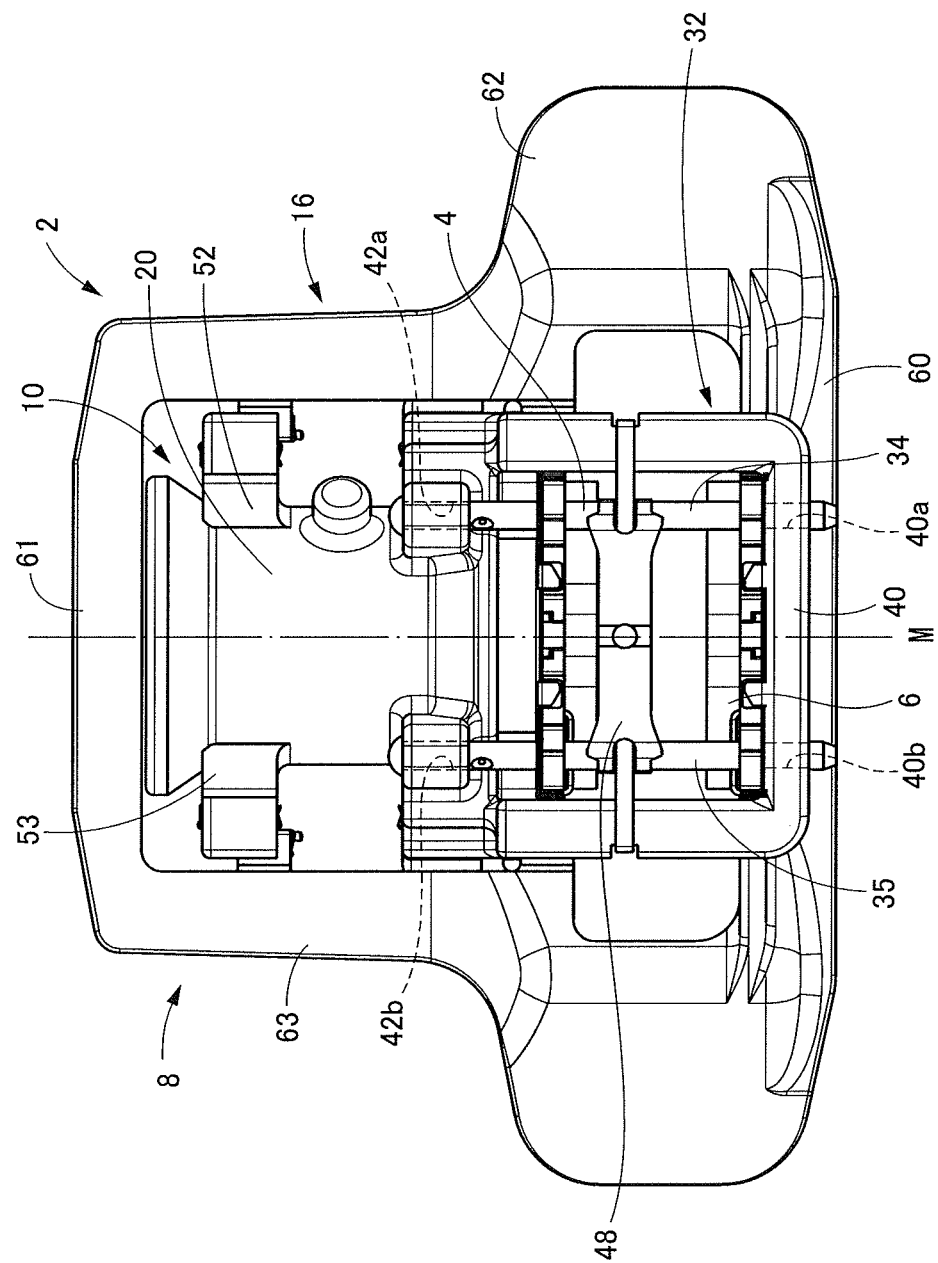
FIG. 2 is a plan view of the disc brake.
Figure 3:
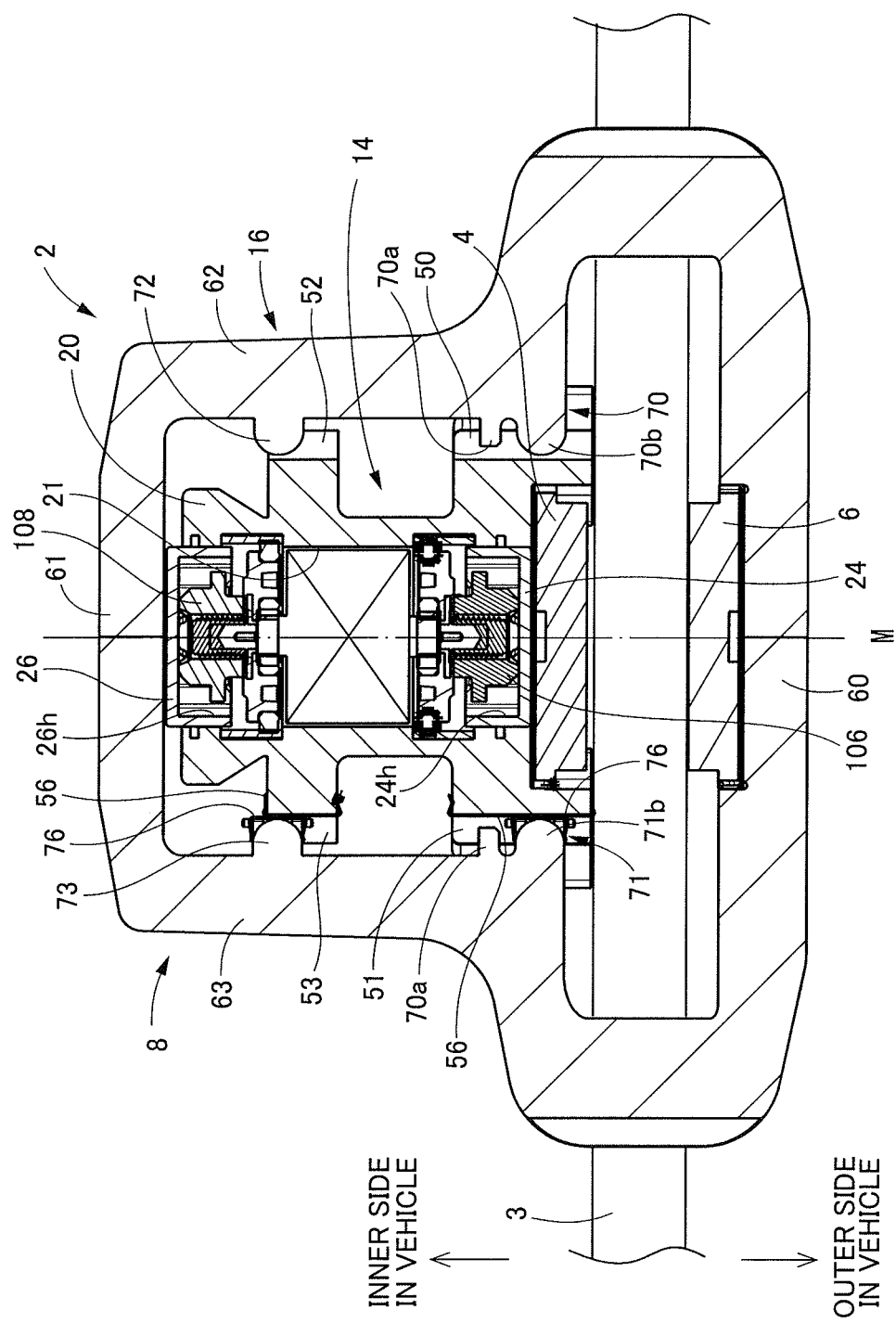
FIG. 3 is a cross-sectional view taken along line III-III in FIG. 4.

The disc-brake apparatus according to the present embodiment includes a floating-type disc brake 2. As illustrated in FIGS. 1-3, the disc brake 2 includes: an inner pad 4 and an outer pad 6 located on opposite sides of a rotation disc 3 configured to rotate with the wheel; a pressing device 8; and a housing 10 holding the pressing device 8. The pressing device 8 includes an electric actuator 14 and a frame 16. It is noted that, as illustrated in FIG. 1, the rotation axis L of the rotation disc 3 and the axis M of the pressing device 8 are parallel with each other. Thus, each of the direction parallel with the rotation axis L of the rotation disc 3 and the direction parallel with parallel with the axis M of the pressing device 8 may be hereinafter referred to as "axial direction". A side on which the outer pad 6 is located in the axial direction is an outer side in the vehicle, and a side on which the inner pad 4 is located in the axial direction is an inner side in the vehicle. The outer side in the vehicle and the inner side in the vehicle may be hereinafter referred to simply as "outer side" and "inner side", respectively.

The housing 10 includes: a main housing portion 20 located on an inner side of the rotation disc 3 in the vehicle as illustrated in FIGS. 1 and 2; a bridge portion 32 extending from the main housing portion 20 toward the outer side over the rotation disc 3; and a pair of pad pins 34, 35 spaced apart from each other in the circumferential direction of the rotation disc 3. The main housing portion 20 extends substantially in the axial direction. As illustrated in FIG. 3, a through hole 21 is formed in the main housing portion 20 so as to extend therethrough in the axial direction. A first pressing member 24 and a second pressing member 26 are fitted in the through hole 21 so as to be movable relative to each other in the axial direction and so as not to be rotatable relative to each other about the axis. For example, the first pressing member 24 and the second pressing member 26 may be fitted in the main housing portion 20 using a key and a keyway. The first pressing member 24 and the second pressing member 26 are fitted in the through hole 21 via a resilient member, not illustrated, capable of applying a resilient force to the first pressing member 24 and the second pressing member 26. Each of the first pressing member 24 and the second pressing member 26 has a substantially cylindrical shape. A central portion of the first pressing member 24 has a nut fitting hole 24*h* which will be described below, and a central portion of the second pressing member 26 has a nut fitting hole 26*h* which will be described below.

Figure 4:
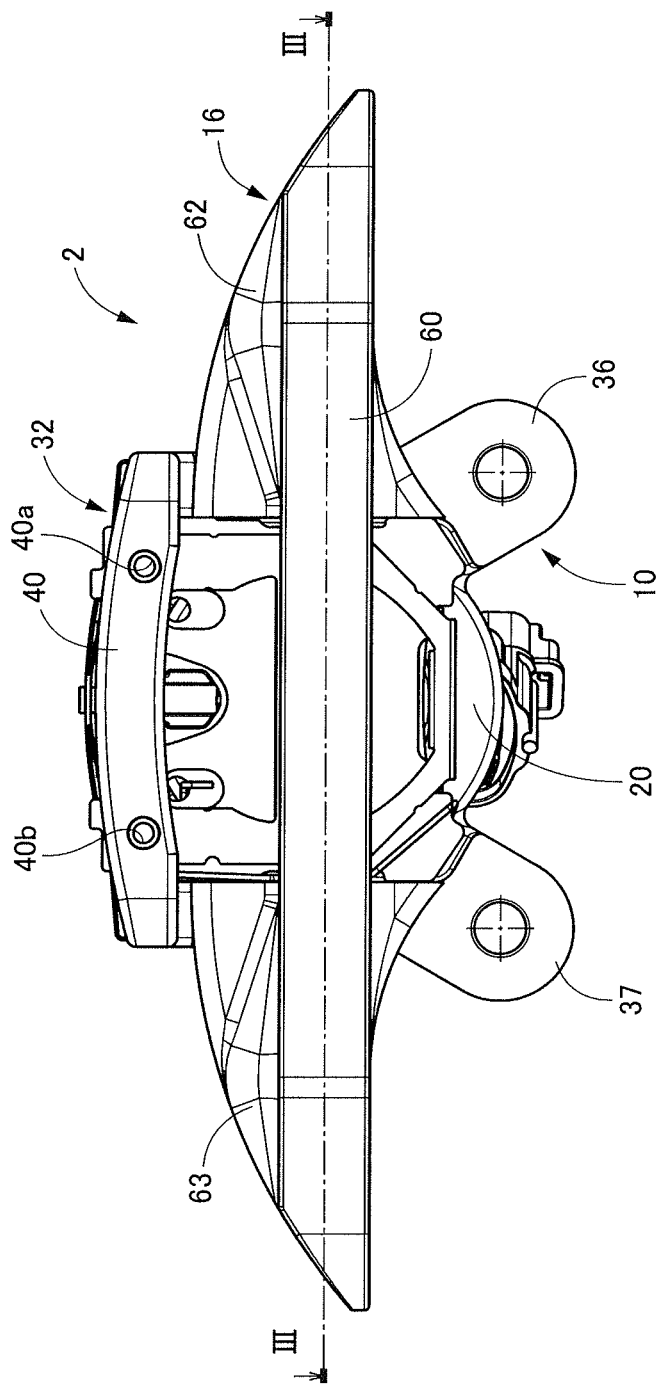
FIG. 4 is a front elevational view of the disc brake.

As illustrated in FIG. 4, a pair of mount portions 36, 37 are provided on the main housing portion 20 near the rotation disc 3 respectively at positions located on opposite sides of the main housing portion 20 in its circumferential direction. The pair of mount portions 36, 37 extend inward in the radial direction of the rotation disc 3. Each of the mount portions 36, 37 is secured to a corresponding one of suspension members (which may be also referred to as "vehicle-body-side component") such as a knuckle as a non-rotating member, not illustrated.

The bridge portion 32 has a substantially three-sided rectangular shape in plan view and includes a portion 40 located on an outer side in the vehicle and extending in the circumferential direction. The portion 40 has two through holes 40*a*, 40*b* spaced apart from each other in the circumferential direction. The main housing portion 20 has through holes 42*a*, 42*b* at positions corresponding to the respective through holes 40*a*, 40*b*. The pad pin 34 extends through the through hole 40*a*, the outer pad 6, the inner pad 4, and the through hole 42*a* in this order. The pad pin 35 extends the through hole 40*b*, the outer pad 6, the inner pad 4, and the through hole 42*b* in this order. The pad pins 34, 35 are supported by the bridge portion 32 and the main housing portion 20 in a state in which each of the pad pins 34, 35 extends in the axial direction.

Thus, the inner pad 4 and the outer pad 6 are held by the pad pins 34, 35 so as to be movable in the axial direction. The pad pins 34, 35 are provided so as to be spaced apart from each other in the circumferential direction, thereby preventing pivotal movement of the inner pad 4 and the outer pad 6 about each of the pad pins 34, 35. A leaf spring in the form of a pad spring 48 is mounted at intermediate portions of the respective pad pins 34, 35. The pad spring 48 applies resilient forces to the respective pad pins 34, 35 respectively in directions in which the pad pins 34, 35 move toward each other. The pad spring 48 reduces looseness of the inner pad 4 and the outer pad 6, thereby suppressing vibrations and abnormal sounds.

Two pairs of engageable recessed portions engageable with the frame 16 are provided on the main housing portion 20 so as to be spaced apart from each other in the axial direction. As illustrated in FIG. 3, the two pairs of engageable recessed portions include a pair of first engageable recessed portions 50, 51 and a pair of second engageable recessed portions 52, 53. The first engageable recessed portions 50, 51 are provided at base portions of the respective mount portions 36, 37 at one of opposite end portions of the main housing portion 20 which is nearer to the rotation disc 3 than the other. The second engageable recessed portions 52, 53 are provided at the other of the opposite end portions of the main housing portion 20 which is farther from the rotation disc 3 than the one of the opposite end portions. The first engageable recessed portion 50 and the first engageable recessed portion 51 are spaced apart from each other in the circumferential direction. The second engageable recessed portion 52 and the second engageable recessed portion 53 are spaced apart from each other in the circumferential direction. The first engageable recessed portion 50 and the second engageable recessed portion 52, and the first engageable recessed portion 51 and the second engageable recessed portion 53 are symmetric in shape with respect to the axis M and are provided on the main housing portion 20 respectively at positions that are symmetric with respect to the axis M. Each of the first engageable recessed portions 50, 51, the second engageable recessed portions 52, 53 may be a grooved portion extending in the axial direction and recessed in the circumferential direction. It is noted that leaf springs 56 are mounted so as to cover bottom surfaces of the first engageable recessed portions 50, 51 and the second engageable recessed portions 52, 53. FIG. 3 illustrates the leaf springs 56 mounted on the first engageable recessed portion 51 and the second engageable recessed portion 53 but omits illustration of the leaf springs 56 mounted on the first engageable recessed portion 50 and the second engageable recessed portion 52.

The frame 16 is a rigid member having a substantially frame shape and held by the main housing portion 20 so as to be movable relative to each other in the axial direction. The frame 16 includes: a first side portion 60 and a second side portion 61 extending in a direction orthogonal to the axis M and spaced apart from each other in the axial direction; and a third side portion 62 and a fourth side portion 63 extending in the direction intersecting the first side portion 60 and the second side portion 61 and spaced apart from each other in the circumferential direction. The third side portion 62 and the fourth side portion 63 couple the first side portion 60 and the second side portion 61 to each other. The first side portion 60 and the second side portion 61 are located on opposite sides of the rotation disc 3 in the axial direction. The first side portion 60 is located on an outer side of the rotation disc 3 and engaged with the outer pad 6 so as to be movable together with the outer pad 6 in the axial direction. The second side portion 61 is located on an inner side of the rotation disc 3 in the vehicle and opposed to the second pressing member 26.

Each of the third side portion 62 and the fourth side portion 63 extends toward the outer and inner sides of the rotation disc 3 in the vehicle. Specifically, as illustrated in FIGS. 1 and 3, each of the third side portion 62 and the fourth side portion 63 extends over the rotation disc 3 on a corresponding one of outer sides of the inner pad 4 and the outer pad 6, without extending over outer circumferential surfaces of the inner pad 4 and the outer pad 6 in the radial direction.

Two pairs of engageable protrusions are provided on inner surfaces of the third side portion 62 and the fourth side portion 63 which face each other at positions located on an inner side of the rotation disc 3. The two pairs of engageable protrusions are spaced apart from each other in the axial direction. The two pairs of engageable protrusions include a pair of first engageable protrusions 70, 71 and a pair of second engageable protrusions 72, 73. Each of the pair of first engageable protrusions 70, 71 includes two protrusions spaced apart from each other in the axial direction. That is, the first engageable protrusion 70 includes two protrusions 70*a*, 70*b*, and the first engageable protrusion 71 includes two protrusions 71*a*, 71*b*. The first engageable protrusions 70 (70*a*, 70*b*), 71 (71*a*, 71*b*), and the pair of second engageable protrusions 72, 73 protrude toward each other in the circumferential direction. In the present embodiment, the first engageable protrusion 70 and the second engageable protrusion 72, and the first engageable protrusion 71 and the second engageable protrusion 73 are symmetric in shape with respect to the axis M and are provided respectively on the third side portion 62 and the fourth side portion 63 of the frame 16 respectively at positions that are symmetric with respect to the axis M. Leaf springs 76 are mounted respectively on the protrusions 70*b*, 71*b* of the respective first engageable protrusions 70, 71 and the second engageable protrusions 72, 73. FIG. 3 illustrates the leaf springs 76 mounted on the protrusion 70b of the first engageable protrusion 70 and the second engageable protrusion 72 but omits illustration of the leaf springs 76 mounted on the protrusion 71b of the first engageable protrusion 71 and the second engageable protrusion 73.

The first engageable protrusions 70, 71 provided on the frame 16 are engaged with the respective first engageable recessed portions 50, 51 formed in the main housing portion 20, and the second engageable protrusions 72, 73 are engaged with the respective second engageable recessed portions 52, 53. With this configuration, the frame 16 is held by the main housing portion 20 so as to be movable in the axial direction. Each of the engageable recessed portions 50, 51, 52, 53 and a corresponding one of the engageable protrusions 70, 71, 72, 73 are engaged with each other via a corresponding one of the leaf springs 56, 76. This configuration reduces a deviation of the position of the frame 16 relative to the position of the main housing portion 20, thereby suppressing abnormal sounds and vibrations.

Figure 5:
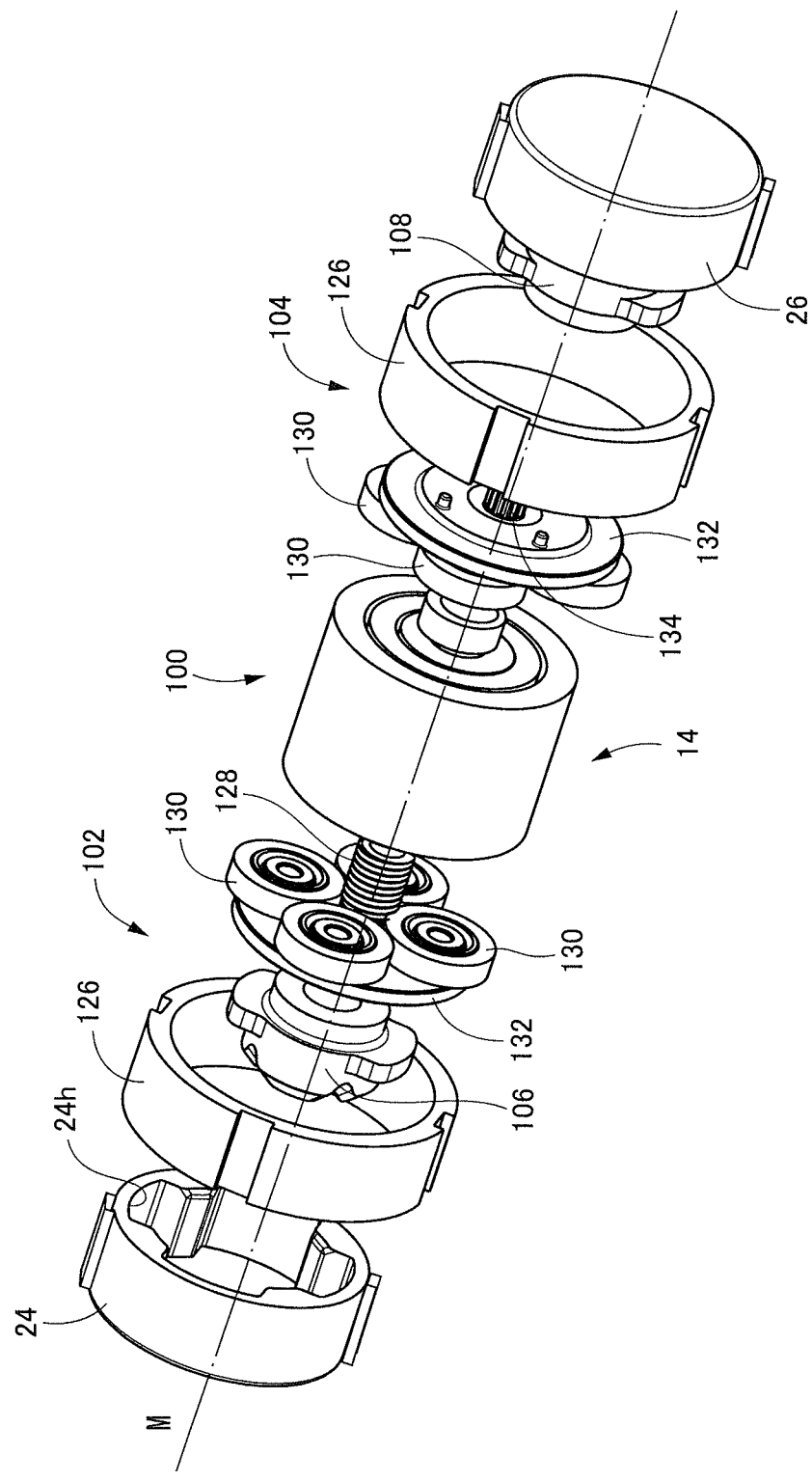
FIG. 5 is an exploded perspective view of an electric actuator of the disc brake.
Figure 6:
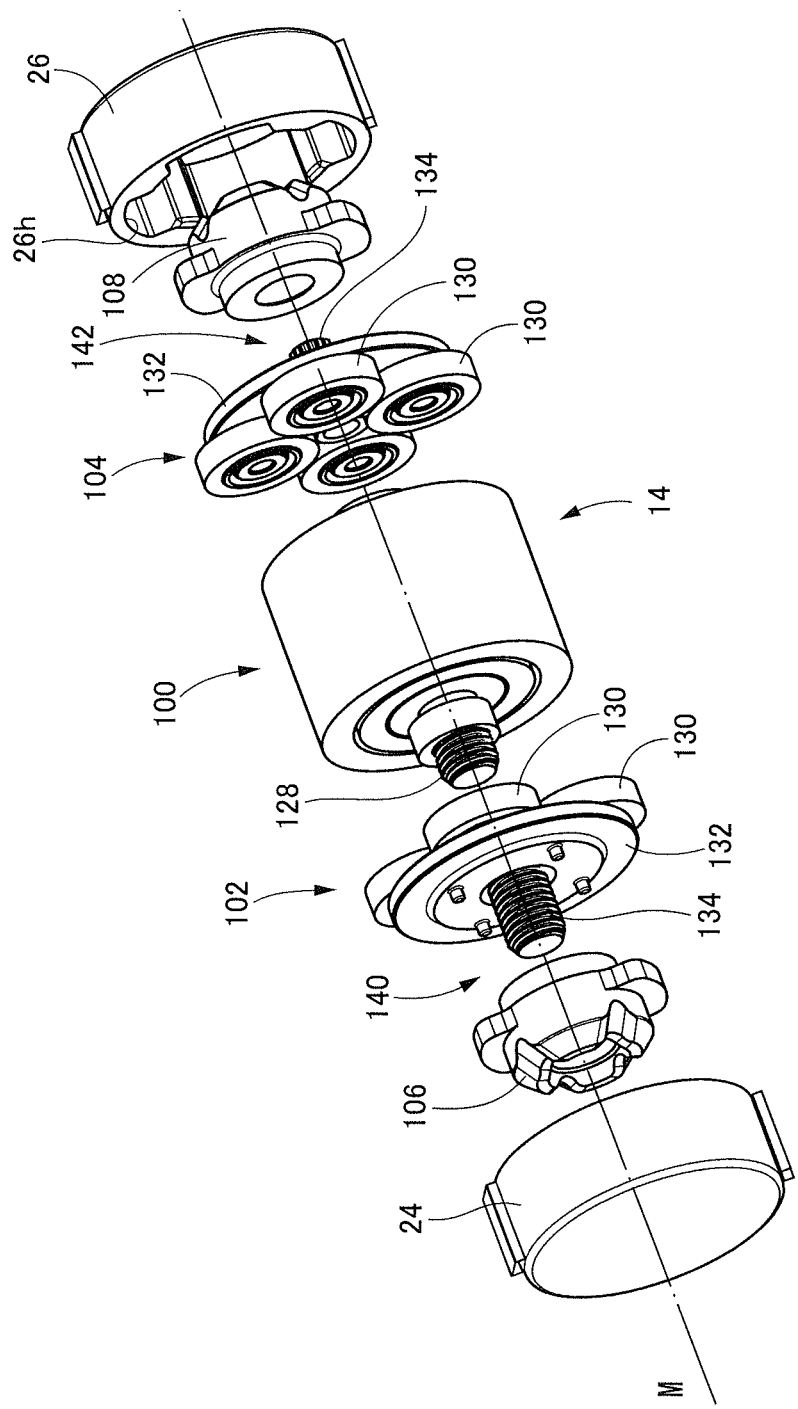
FIG. 6 is an exploded perspective view of the electric actuator viewed in another direction.
Figure 7:
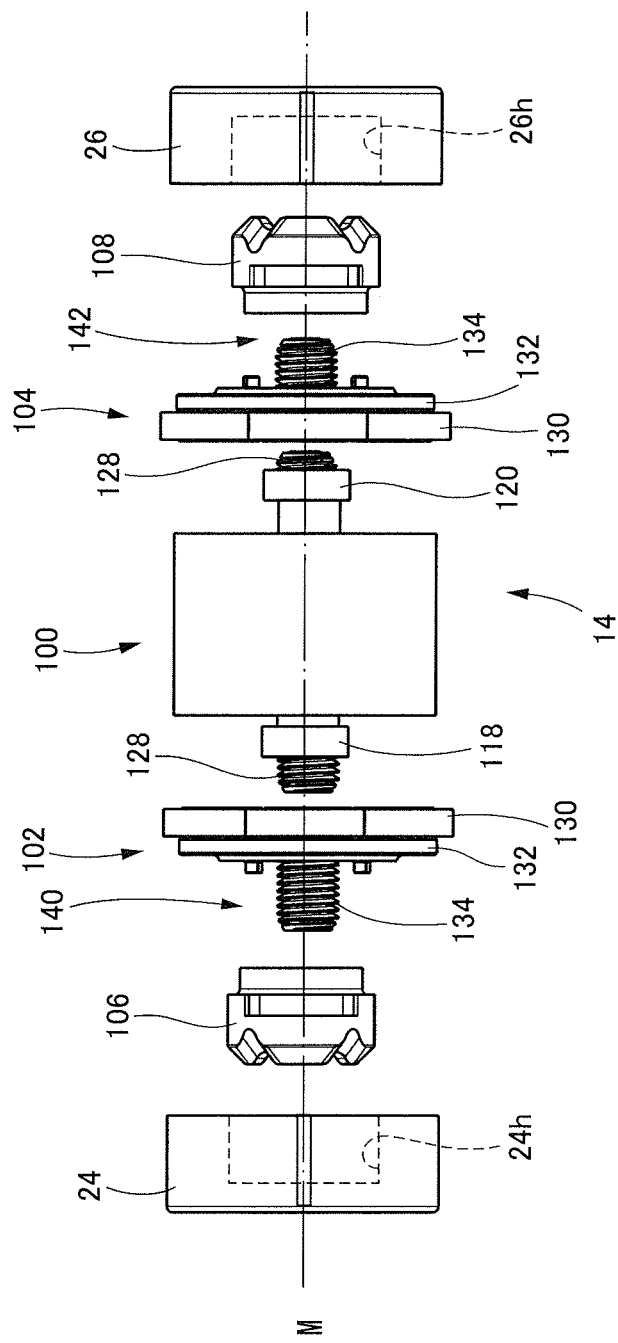
FIG. 7 is an exploded plan view of the electric actuator.
Figure 8:
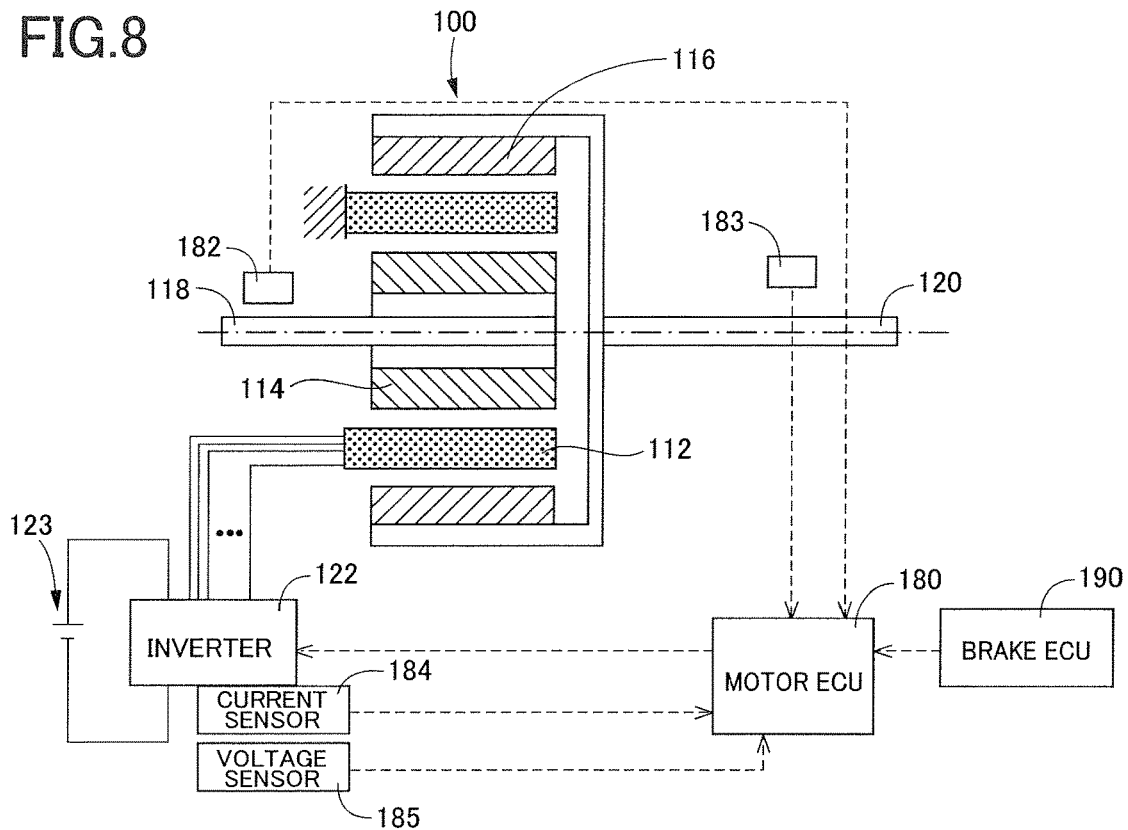
FIG. 8 is a view conceptually illustrating a configuration of an electric motor of the electric actuator.
Figure 9:
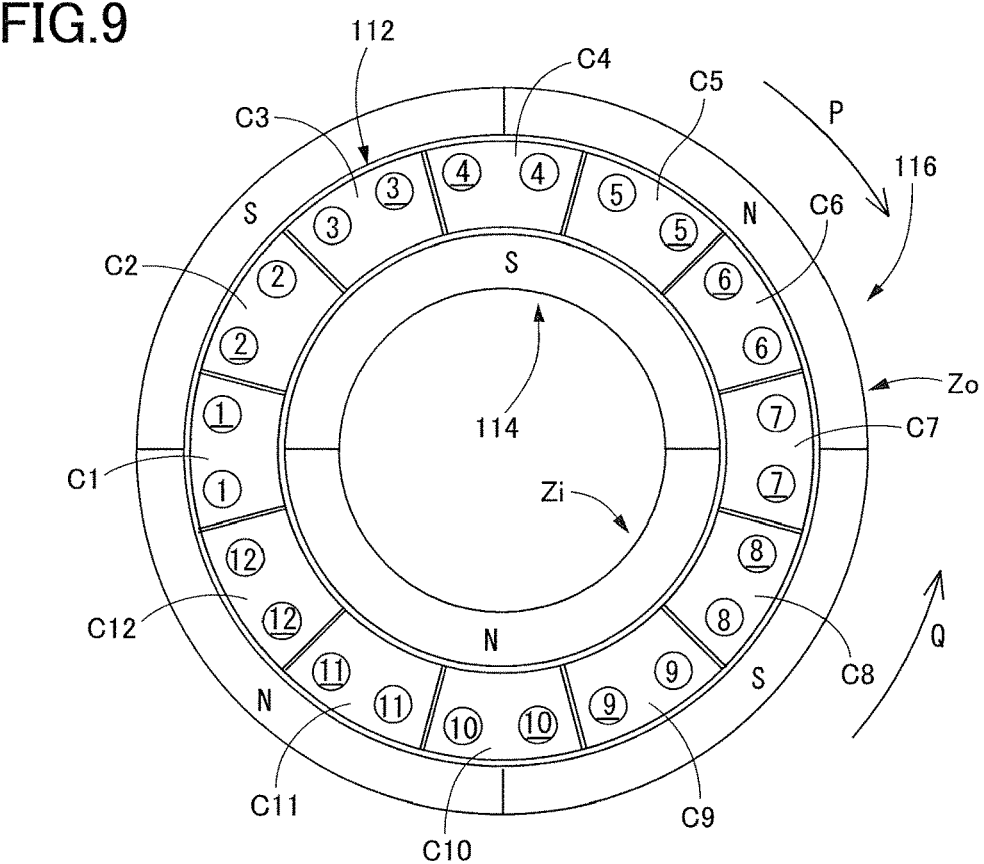
FIG. 9 is a view conceptually illustrating a configuration of the electric motor.

As illustrated in FIGS. 5-7, the electric actuator 14 includes a two-axis motor 100, a pair of speed reducers 102, 104, and a pair of nut members 106, 108. The two-axis motor 100 is commercially available in general. As illustrated in FIG. 8, the two-axis motor 100 includes: a stator 112 having substantially a cylindrical shape and provided on an inner circumferential side of the main housing portion 20; an inner rotor 114 having a substantially cylindrical shape and provided on an inner circumferential side of the stator 112 with a space therebetween; an outer rotor 116 having a substantially cylindrical shape and provided on an outer circumferential side of the stator 112 with a space therebetween; an inner-side output shaft 118 rotatable integrally with the inner rotor 114; and an outer-side output shaft 120 rotatable integrally with the outer rotor 116. As illustrated in FIG. 9, the stator 112 includes a plurality of coils C1, C2, and so on that are spaced apart from each other. The stator 112 is fixed to the main housing portion 20. Each of the coils C1, C2, and so on is connected to a power source 123, such as a battery, via an inverter 122.

As illustrated in FIG. 9, the inner rotor 114 includes a permanent magnet Zi. The polarity of the permanent magnet Zi changes by 180 degrees (in order of the S pole and the N pole). The outer rotor 116 includes a permanent magnet Zo. The polarity of the permanent magnet Zo changes by 90 degrees (in order of the S pole, the N pole, the S pole, and the N pole). Each of the inner rotor 114 and the outer rotor 116 is held by the main housing portion 20 so as to be rotatable relative to the main housing portion 20. In the two-axis motor 100, the stator 112, the inner rotor 114, and the outer rotor 116 are provided on the same axis so as to overlap each other in the radial direction (the direction orthogonal to the axis). The inner-side output shaft 118 and the outer-side output shaft 120 are provided on the same axis on which the stator 112, the inner rotor 114, and the outer rotor 116 are provided.

The speed reducers 102, 104 have the same configuration, and each of the speed reducers 102, 104 includes a planetary gear mechanism. Each of the speed reducers 102, 104 includes: a ring gear 126 mounted on the main housing portion 20 so as not to be rotatable relative to the main housing portion 20; a sun gear 128 with which a corresponding one of the inner-side output shaft 118 and the outer-side output shaft 120 of the two-axis motor 100 (in other words, an input shaft for a corresponding one of the speed reducers 102, 104) is engaged such that each of the inner-side output shaft 118 and the outer-side output shaft 120 is rotatable integrally with the sun gear 128; a planetary-gear carrier 132 holding four planetary gears 130; and an output shaft 134 rotatable integrally with the planetary-gear carrier 132.

The output shaft 134 of each of the speed reducers 102, 104 has a male threaded portion that is engaged with a female threaded portion formed on an inner circumferential portion of a corresponding one of the nut members 106, 108. As illustrated in FIG. 7, the nut members 106, 108 are fitted in the respective nut fitting holes 24h, 26h of the first pressing member 24 and the second pressing member 26 so as not to be rotatable relative to the respective nut fitting holes 24h, 26h and so as to be movable the respective nut fitting holes 24h, 26h in the axial direction.

In the present embodiment as described above, the speed reducer 102 is one example of an inner-side speed reducer, and the speed reducer 104 is one example of an outer-side speed reducer. A first motion converter 140 is, for example, constituted by the male threaded portion formed on the output shaft 134 of the inner-side speed reducer 102, and the nut member 106 having the female threaded portion. A second motion converter 142 is, for example, constituted by the male threaded portion formed on the output shaft 134 of the outer-side speed reducer 104, and the nut member 108 having the female threaded portion.

As illustrated in FIG. 8, the disc-brake apparatus includes a motor ECU 180 principally constituted by a computer. Devices connected to the motor ECU 180 include: a rotation-angle sensor 182 configured to detect the rotation angle (the phase) of the inner-side output shaft 118; a rotation-angle sensor 183 configured to detect the rotation angle (the phase) of the outer-side output shaft 120; a current sensor 184 configured to detect a current flowing in each of the coils C1, C2, and so on of the stator 112; a voltage sensor 185 configured to detect a voltage; and the inverter 122. Torque to be applied to each of the inner rotor 114 and the outer rotor 116 is obtained based on the current flowing in each of the coils C1, C2, and so on which is detected by the current sensor 184. A frequency and so on are obtained based on changes in the voltage applied to, e.g., each of the coils C1, C2, and so on which is detected by the voltage sensor 185. The rotational phases of the inner-side output shaft 118 and the outer-side output shaft 120 as values detected by the rotation-angle sensors 182, 183 correspond respectively to the rotational phases of the inner rotor 114 and the outer rotor 116. It is noted that the rotational speeds of the inner rotor 114 and the outer rotor 116 may be obtained based on changes in the rotational phase of each of the inner-side output shaft 118 and the outer-side output shaft 120. A brake ECU 190 is connected to the motor ECU 180, and communication is performed between the brake ECU 190 and the motor ECU 180.

The brake ECU 190 obtains requested torque to be applied to the two-axis motor 100, and so on, based on an operation state of a brake operating member, not illustrated, a traveling state of the vehicle, and a situation around the vehicle, for example. The brake ECU 190 supplies information representing the requested torque to the motor ECU 180, for example. While the case where the information representing the requested torque to be applied to the two-axis motor 100 is supplied from the brake ECU 190 to the motor ECU 180 is explained in the present embodiment for the sake of simplicity, the brake ECU 190 may supply information representing a requested axial force that is a requested value of an axial force to be applied to each of the first pressing member 24 and the second pressing member 26.

In the electric disc-brake apparatus configured as described above, the current is supplied to each of the coils C1, C2, and so on of the stator 112 of the two-axis motor 100, thereby rotating the inner rotor 114 and the outer rotor 116, which rotates the inner-side output shaft 118 and the outer-side output shaft 120. The rotation of the inner-side output shaft 118 and the rotation of the outer-side output shaft 120 are respectively decelerated by the respective speed reducers 102, 104, and the output shaft 134 is rotated. The rotation of each of the output shafts 134 is converted by a corresponding one of the motion converters 140, 142 to linear movement which is output to a corresponding one of the nut members 106, 108. Movement of each of the nut members 106, 108 moves a corresponding one of the first pressing member 24 and the second pressing member 26. The movement of the first pressing member 24 presses the inner pad 4 against the rotation disc 3. The movement of the second pressing member 26 moves the frame 16 to press the outer pad 6 against the rotation disc 3. The inner pad 4 and the outer pad 6 are frictionally engaged with the rotation disc 3 to reduce rotation of the rotation disc 3, thereby reducing rotation of the wheel.

In this case, actual torque applied to each of the inner rotor 114 and the outer rotor 116 is obtained based on, e.g., a value detected by the current sensor 184, and feedback control is executed for currents supplied to the coils C1, C2, and so on such that the actual torque is brought closer to a requested torque.

Figure 10:
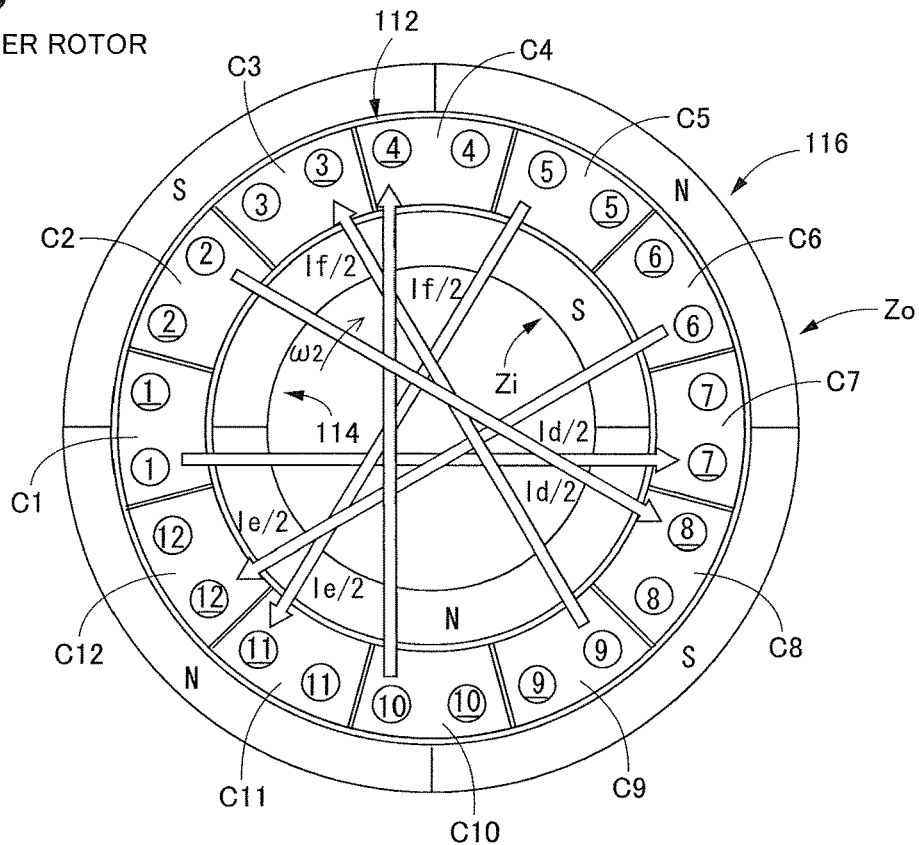
FIG. 10 is a view conceptually illustrating a current-supply state of a stator of the electric motor.
Figure 11:
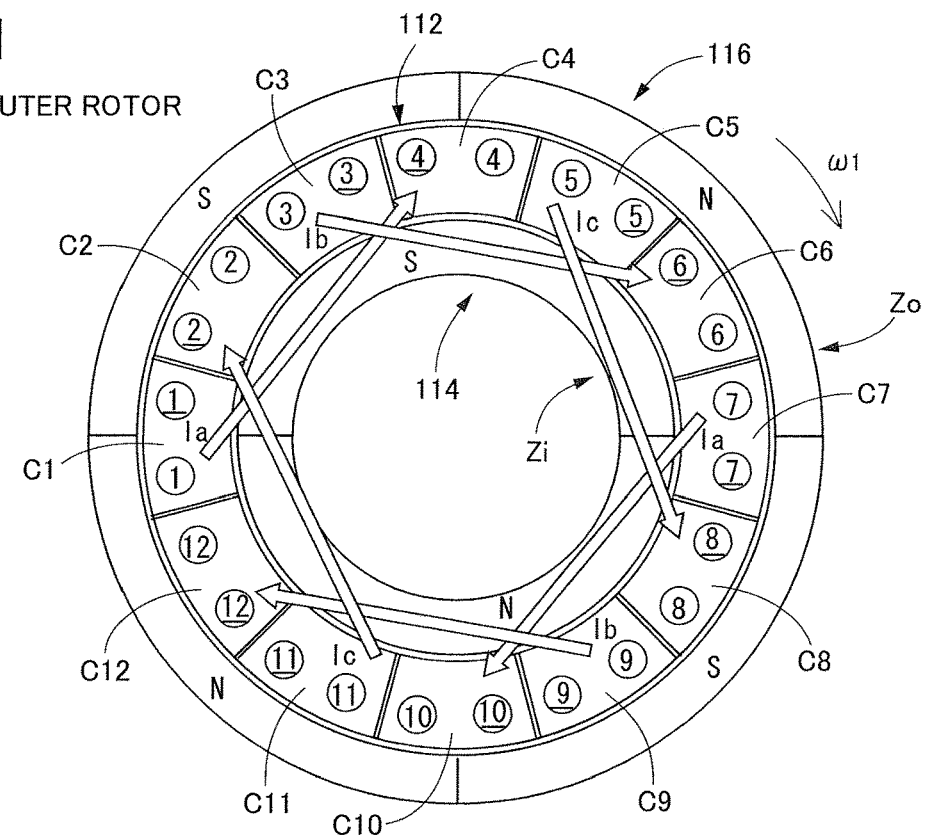
FIG. 11 is a view conceptually illustrating another current-supply state of the stator.

For example, as illustrated in FIG. 10, currents Id, Ie, If are selectively applied to the coils C1, C2, and so on to generate a rotating magnetic field for the inner rotor 114. As illustrated in FIG. 11, in contrast, currents Ia, Ib, Ic are selectively applied to the coils C1, C2, and so on to generate a rotating magnetic field for the outer rotor 116. That is, combined currents constituted by the currents Id, Ie, If and the currents Ia, Ib, Ic are supplied to the coils C1, C2, and so on. The torque and so on for the inner rotor 114 are controlled by controlling the currents Id, Ie, If. The torque and so on for the outer rotor 116 are controlled by controlling the currents Ia, Ib, Ic. The reason why these controls are possible is described in Japanese Patent Application Publication No. 11-275826 and Japanese Patent Application Publication No. 2001-231227 in detail, for example. Thus, the reason will be briefly described in this specification.

As described above, as illustrated in FIG. 9, the inner rotor 114 includes the permanent magnet Zi, the polarity of which changes between the S pole and the N pole by 180 degrees, and the outer rotor 116 includes the permanent magnet Zo, the polarity of which changes between the S pole and the N pole by 90 degrees. With the arrangement of the magnetic poles in each of the inner rotor 114 and the outer rotor 116, no rotational power is applied from the permanent magnet Zo of the outer rotor 116 to the permanent magnet Zi of the inner rotor 114, and no rotational power is applied from the permanent magnet Zi of the inner rotor 114 to the permanent magnet Zo of the outer rotor 116.

Now consider that effects of the permanent magnet Zi of the inner rotor 114 on the outer rotor 116, for example. It is assumed that the inner rotor 114 is fixed for easy understanding. If the S pole and the N pole of an upper magnet of the outer rotor 116 which is opposed to the S pole of the inner rotor 114 are to be rotated in the clockwise direction indicated by arrow P by a magnetic force produced by the S pole of the inner rotor 114 in the state illustrated in FIG. 9 in a relationship between the S pole of the inner rotor 114, and the S pole and the N pole of the upper magnet of the outer rotor 116, the S pole and the N pole of a lower magnet of the outer rotor 116 which is opposed to the N pole of the inner rotor 114 are to be rotated in the counterclockwise direction indicated by arrow Q by the N pole of the inner rotor 114 in a relationship between the N pole of the inner rotor 114, and the S pole and the N pole of the lower magnet of the outer rotor 116. That is, a magnetic force applied from the S pole of the inner rotor 114 to the upper magnet of the outer rotor 116 and a magnetic force applied from the N pole of the inner rotor 114 to the lower magnet of the outer rotor 116 are canceled out. As a result, rotation of the outer rotor 116 is controllable only by a relationship between the outer rotor 116 and the stator 112 regardless of a relationship between the outer rotor 116 and the inner rotor 114, and rotation of the inner rotor 114 is controllable only by a relationship between the inner rotor 114 and the stator 112 regardless of the relationship between the inner rotor 114 and the outer rotor 116. This applies to a relationship among the rotating magnetic field generated by the coils C1, C2, and so on of the stator 112, the inner rotor 114, and the outer rotor 116 as will be described below.

As illustrated in FIG. 9, three coils C are provided for each magnetic pole of the outer rotor 116 in the stator 112. Thus, a total of twelve (=3×4) coils C1, C2, and so on of the stator 112 are equally spaced on the circumference of the same circle. In the case where the inner rotor 114 is rotated, as illustrated in FIG. 10, the three-phase alternating currents Id, If, Ie are selectively supplied to three pairs of coils: a pair of coils C1, C2 and C7, C8; a pair of coils C3, C4 and C9, C10; and a pair of coils C5, C6 and C11, C12. Each of the underlines drawn under the numbers represents a flow of a current in an opposite direction. For example, the words "feed the current Id through the pair of coils C1, C2 and C7, C8" means feeding a current Id/2 (half the current Id) from the coil C1 toward the coil C7 and feeding the current Id/2 from the coil C2 toward the coil C8. In this case, the coil C1 and the coil C2 are located closer to each other on the circumference of the circle, and likewise the coil C7 and the coil C8 are located closer to each other. Thus, this current supply makes it possible to generate rotating magnetic fields that are equal in number to the magnetic poles (the two magnetic poles) of the inner rotor 114, thereby rotating the inner rotor 114.

In the case where the outer rotor 116 is rotated, as illustrated in FIG. 11, the three-phase alternating currents Ia, Ic, Ib are supplied to three sets of coils: a set of coils C1, C4, C7, C10; a set of coils C2, C5, C8, C11; and a set of coils C3, C6, C9, and C12. In this case, the words "feed the current Ia through the set of coils C1, C4, C7, C10" means feeding the current Ia from the coil C1 toward the coil C4 and feeding the current Ia from the coil C7 toward the coil C10. The coil C1 and the coil C7 are located on the circumference of the circle at a distance corresponding to 180 degrees, and likewise the coil C4 and the coil C10 are located at a distance corresponding to 180 degrees. Also, the coils C1, C4, C7, C10 are spaced apart from each other by 90 degrees. Thus, this current supply makes it possible to generate rotating magnetic fields that are equal in number to the magnetic poles (the four magnetic poles) of the outer rotor 116.

In view of the above, the following combined currents I1-I12 may be fed through the twelve coils C1-C12, respectively:

$I1=Id/2+Ia$ $I2=Id/2+Ic$ $I3=If/2+Ib$ $I4=If/2+\underline{Ia}$ $I5=Ie/2+\underline{Ic}$ $I6=Ie/2+Ib$ $I7=Id/2+Ia$ $I8=Id/2+\underline{Ic}$ $I9=If/2+Ib$ $I10=If/2+\underline{Ia}$ $I11=Ie/2+Ic$ $I12=Ie/2+\underline{Ib}$ It is noted that each of the underlines drawn under the signs represents a flow of a current in an opposite direction.

Thus, when the combined currents are supplied to the coils C1, C2, and so on of the stator 112 in the two-axis motor 100, the rotating magnetic field for the inner rotor 114 and the rotating magnetic field for the outer rotor 116 are generated at the same time. However, no rotational power is applied from the rotating magnetic field for the outer rotor 116 to the inner rotor 114, and no rotational power is applied from the rotating magnetic field for the inner rotor 114 to the outer rotor 116. Accordingly, the torque for the inner rotor 114 is controllable by control of a current that generates the rotating magnetic field for the inner rotor 114 among the combined currents, and the torque for the outer rotor 116 is controllable by control of a current that generates the rotating magnetic field for the outer rotor 116 among the combined currents.

Thus, in the present embodiment, the currents to be supplied to the coils C1-C12 are controlled such that torque output from the outer rotor 116 is greater than torque output from the inner rotor 114. Each of the torque output from the outer rotor 116 and the torque output from the inner rotor 114 can be expressed as follows as described in Japanese Patent Application Publication No. 11-275826.

In the case where each of the permanent magnet Zo of the outer rotor 116, and the permanent magnet Zi of the inner rotor 114 is replaced with an equivalent coil, magnetic flux densities $B_1$, $B_2$ generated by the respective permanent magnets Zo, Zi are expressed by the following equation:

$B_1=\mu \times Im_1 \times \sin(2\omega_1 t-2\theta)$ $B_2=\mu \times Im_2 \times \sin(\omega_2 t+\alpha-\theta)$ where $\mu$ is magnetic permeability, $Im_1$ is an equivalent direct current for the permanent magnet Zo of the outer rotor 116, $Im_2$ is an equivalent direct current for the permanent magnet Zi of the inner rotor 114, $\omega_1$ is the rotation angle velocity of the outer rotor 116, $\omega_2$ is the rotation angle velocity of the inner rotor 114, and $\alpha$ is a phase difference between the inner rotor 114 and the outer rotor 116 in the case where time t is zero.

In the case where three-phase alternating currents Icd(t), Ice(t), Icf(t) are supplied to generate a rotating magnetic field for the inner rotor 114, and three-phase alternating currents Ica(t), Icb(t), Icc(t) are supplied to generate a rotating magnetic field for the outer rotor 116, a magnetic flux density Bc is generated by the stator 112 is expressed by the following equation:

$Bc=Bc_1+Bc_2$ $Bc_1=\mu \times n \times \{Ica(t) \times \sin(2\theta)+Icb(t) \times \sin(2\theta-2\pi/3)+Icc(t) \times \sin(2\theta-4\pi/3)\}$ $Bc_2=\mu \times n \times \{Icd(t) \times \sin(\theta)+Ice(t) \times \sin(\theta-2\pi/3)+Icf(t) \times \sin(\theta-4\pi/3)\}$ where $Bc_1$ is a magnetic flux density generated by the rotating magnetic field for the outer rotor 116, $Bc_2$ is a magnetic flux density generated by the rotating magnetic field for the inner rotor 114, and n is a coil constant.

The entire magnetic flux density B at an angle $\theta$ can be expressed by the sum of the magnetic flux densities $B_1$, $B_2$, Bc ($B=B_1+B_2+Bc$).

Torque $\tau_1$ applied to the outer rotor 116 is expressed by the following equation:

$\tau_1=f_1 \times r_1$ where $r_1$ is a radius of the outer rotor 116 from the center of the two-axis motor 100, and $f_1$ is a force determined based on the magnetic flux densities B respectively in the case where the angle $\theta$ is equal to $\omega_1 t$, the case where the angle $\theta$ is equal to $\omega_1 t+\pi/2$, the case where the angle $\theta$ is equal to $\omega_1 t+\pi$, and the case where the angle $\theta$ is equal to $\omega_1 t+3\pi/2$.

$f_1=Im_1 \times \{B(\theta=\omega_1 t)+B(\theta=\omega_1 t+\pi)-B(\theta=\omega_1 t+\pi/2)-B(\theta=\omega_1 t+3\pi/2)\}$ Organizing the equation above yields the following equation:

$f_1=4\mu \times Im_1 \times n \times \{Ica(t) \times \sin(2\omega_1 t)+Icb(t) \times \sin(2\omega_1 t-2\pi/3)+Icc(t) \times \sin(2\omega_1 t-4\pi/3)\}$ This equation makes it obvious that the force $f_1$ acting on the outer rotor 116, i.e., the torque $\tau_1$, is determined by the currents Ica(t), Icb(t), Icc(t) for generating the rotating magnetic field for the outer rotor 116.

Torque $\tau_2$ applied to the inner rotor 114 is expressed by the following equation:

$\tau_2=f_2 \times r_2$ where $r_2$ is a radius of the inner rotor 114 from the center of the two-axis motor 100, and $f_2$ is a force determined based on the magnetic flux densities B respectively in the case where the angle $\theta$ is equal to $\omega_2 t+\alpha$, and the case where the angle $\theta$ is equal to $\omega_2 t+\alpha+\pi$.

$f_2=Im_2 \times B(\theta=\omega_2 t+\alpha)+Im_2 \times B(\theta=\omega_2 t+\alpha+\pi)$ Organizing the equation above yields the following equation:

$f_2=2\mu \times Im_2 \times n \times \{Icd(t) \times \sin(\omega_2 t+\alpha)+Ice(t) \times \sin(\omega_2 t+\alpha-2\pi/3)+Icf(t) \times \sin(\omega_2 t+\alpha-4\pi/3)\}$ This equation makes it obvious that the force $f_2$ acting on the inner rotor 114, i.e., the torque $\tau_2$, is determined by the currents Icd(t), Ice(t), Icf(t) for controlling the rotating magnetic field for the inner rotor 114.

In view of the above, in the present embodiment, the currents Ica(t), Icb(t), Icc(t) for generating the rotating magnetic field for the outer rotor 116 are controlled such that the torque $\tau_1$ to be applied to the outer rotor 116 becomes requested torque $\tau_1^*$. Also, the currents Icd(t), Ice(t), Icf(t) for generating the rotating magnetic field for the inner rotor 114 are controlled such that the torque $\tau_2$ to be applied to the inner rotor 114 is brought closer to requested torque $\tau_2^*$ ($\tau_1^*>\tau_2^*$) that is less than the requested torque $\tau_1^*$.

The torque for the inner rotor 114 moves the first pressing member 24 toward the rotation disc 3 to press the inner pad 4 against the rotation disc 3. The torque for the outer rotor 116 moves the second pressing member 26 away from the rotation disc 3, thereby moving the frame 16 relative to the main housing portion 20 in the axial direction to press the outer pad 6 against the rotation disc 3. Thus, not only friction between the second pressing member 26 and the main housing portion 20 but also friction between the frame 16 and the main housing portion 20 is caused in a period from the movement of the second pressing member 26 to the press of the outer pad 6 against the rotation disc 3. Accordingly, a loss of torque due to the friction in the period from the movement of the second pressing member 26 to the press of the outer pad 6 against the rotation disc 3 is greater than a loss in a period from the movement of the first pressing member 24 to the press of the inner pad 4 against the rotation disc 3. In the present embodiment, in contrast, the torque output from the outer rotor 116 is made greater than the torque output from the inner rotor 114. This reduces a difference between a force by which the inner pad 4 is pressed against the rotation disc 3 and a force by which the outer pad 6 is pressed against the rotation disc 3.

The presses of the inner pad 4 and the outer pad 6 against the rotation disc 3 actuate the disc brake 2 to reduce rotation of the wheel. As illustrated in FIG. 1, the frame 16 receives a reaction force R related to a pressing force F applied from the inner pad 4 and the outer pad 6 to the rotation disc 3. That is, the frame 16 receives the pressing force F and the reaction force R respectively directed in opposite directions. The lines of application of the forces F, R are located on the same plane in the frame 16. This configuration reduces inclination of the frame 16 during operation of the disc brake 2, thereby reducing lowering of the pressing force due to the inclination of the frame 16.

In the present embodiment, the stator 112, the inner rotor 114, and the outer rotor 116 overlap each other in the radial direction in the two-axis motor 100. With this configuration, when compared with the case where the inner rotor 114 and the outer rotor 116 are arranged in the axial direction, it is possible to reduce the length of the electric actuator 14 in the axial direction, thereby reducing the length of the disc-brake apparatus in the axial direction.

If the electric actuator is provided on a member that is held by a vehicle-body-side component such as a caliper so as to be movable in the axial direction, the caliper is inclined, and the behavior of the caliper becomes unstable. In the present embodiment, in contrast, the electric actuator 14 including the two-axis motor 100 is provided on the main housing portion 20, i.e., the component fixed to the vehicle-body-side component. This prevents inclination of the frame 16 and stabilizes the behavior of the frame 16. Also, the electric actuator is provided on the component fixed to the vehicle-body-side component, it is possible to arrange a wire harness well.

Designing a speed reduction ratio for each of the speed reducers 102, 104 can set the maximum output of the disc-brake apparatus to a desired magnitude, for example. Also, changing the dimension of the electric actuator in the radial direction achieves a disc-brake apparatus applicable to any of a large vehicle and a compact vehicle. The electric actuator may be replaced with a hydraulic actuator without changes of the outer shape of the disc brake. For example, also in the case where disc brakes including the hydraulic actuators are provided on the front wheels, and disc brakes including the electric actuators are provided on the rear wheels, it is possible to provide consistency in the entire vehicle.

In the present embodiment described above, each of a current controller and a torque controller is constituted by the motor ECU 180, the inverter 122, and so on.

While both of the inner pad 4 and the outer pad 6 are held by the housing 10 in the above-described embodiment, only the inner pad 4 may be held by the housing 10. For example, the outer pad 6 may be held by the frame 16.

The two-axis motor 100 may be controlled in any manner. Feedback control may be executed for the rotational speed of each of the inner rotor 114 and the outer rotor 116, and feedback control may be executed for the frequency of the current or the voltage, for example. The speed reducers 102, 104 are not essential. It is to be understood that the disclosure is not limited to the details of the illustrated embodiment, but may be embodied with various changes and modifications, which may occur to those skilled in the art, without departing from the spirit and scope of the disclosure. For example, the structures and materials of the two-axis motor 100 and the speed reducers 102, 104 are not limited.

The invention claimed is:

1. A disc-brake apparatus comprising a disc brake of a floating type comprising:
   an inner pad and an outer pad respectively located on opposite sides of a rotation disc rotatable with a wheel;
   a pressing device configured to press the inner pad and the outer pad against the rotation disc; and
   a housing mounted on a non-rotating member and holding the pressing device,
   wherein the pressing device comprises:
      a first pressing member movable toward the rotation disc;
      a second pressing member movable away from the rotation disc;
      a frame having substantially a frame shape and comprising (i) a first side portion opposed to the second pressing member, and (ii) a second side portion engaged with the outer pad so as to be movable integrally with the outer pad in a direction parallel with a rotation axis of the rotation disc; and
      an electric actuator configured to move the first pressing member and the second pressing member, and
   wherein the electric actuator comprises:
      a two-axis motor comprising (i) a stator comprising a plurality of coils and having a substantially cylindrical shape, (ii) an inner rotor located on an inner circumferential side of the stator; and (iii) an outer rotor located on an outer circumferential side of the stator;
      a first motion converter configured to convert rotation of the inner rotor to linear movement to transmit the linear movement to the first pressing member; and
      a second motion converter configured to convert rotation of the outer rotor to linear movement to transmit the linear movement to the second pressing member.

2. The disc-brake apparatus according to claim 1, further comprising a current controller configured to individually control output torque of each of the inner rotor and the outer rotor by controlling a supply current to be supplied to each of the plurality of coils of the stator,
   wherein the current controller is configured to control the supply current to be supplied to each of the plurality of coils, such that the output torque of the outer rotor is greater than the output torque of the inner rotor.

3. The disc-brake apparatus according to claim 1,
   wherein the electric actuator comprises:
      an inner-side speed reducer configured to reduce a speed of the rotation of the inner rotor;
      an outer-side speed reducer configured to reduce a speed of the rotation of the outer rotor, wherein the first motion converter is configured to convert rotation of an output shaft of the inner-side speed reducer to linear movement and transmit the linear movement to the first pressing member, and wherein the second motion converter is configured to convert rotation of an output shaft of the outer-side speed reducer to linear movement and transmit the linear movement to the second pressing member.

4. The disc-brake apparatus according to claim 2, wherein the electric actuator comprises:
   an inner-side speed reducer configured to reduce a speed of the rotation of the inner rotor;
   an outer-side speed reducer configured to reduce a speed of the rotation of the outer rotor,
wherein the first motion converter is configured to convert rotation of an output shaft of the inner-side speed reducer to linear movement and transmit the linear movement to the first pressing member, and
wherein the second motion converter is configured to convert rotation of an output shaft of the outer-side speed reducer to linear movement and transmit the linear movement to the second pressing member.

* * * * *